United States Patent [19]
Klein

[11] 3,753,016
[45] Aug. 14, 1973

[54] BEARING SYSTEM FOR SHAFTS DRIVEN BY AN ELECTRIC MOTOR

[75] Inventor: Gerald Klein, Ruckersdorf, Germany

[73] Assignee: Siemens Aktiengesellschaft, Berlin and Munich, Germany

[22] Filed: Mar. 17, 1972

[21] Appl. No.: 235,511

[52] U.S. Cl. ..................... 310/90, 308/9
[51] Int. Cl. ............................. H02k 7/08
[58] Field of Search ............. 310/67, 90; 308/9

[56] References Cited
UNITED STATES PATENTS

| | | | |
|---|---|---|---|
| 3,656,017 | 4/1972 | Inagaki et al. | 310/90 |
| 3,302,048 | 1/1967 | Gray | 310/90 |
| 3,027,471 | 3/1962 | Burgwin et al. | 310/90 X |
| 3,525,003 | 8/1970 | Misenti | 310/90 |
| 2,998,999 | 9/1961 | Morser et al. | 310/90 UX |
| 3,385,985 | 5/1968 | Henderson | 310/90 |
| 3,110,828 | 11/1963 | Sternlicht | 310/67 |

Primary Examiner—D. F. Duggan
Attorney—Arthur E. Wilfond, Herbert L. Lerner et al.

[57] ABSTRACT

For the bearing support of shafts driven at high speed, particularly shafts of centrifuges, either the rotor proper is of rotationally symmetric construction or is provided with rotationally symmetric extensions or appendages, the rotationally symmetric surfaces of which at least partly form supporting surfaces of an air bearing.

1 Claim, 4 Drawing Figures

BEARING SYSTEM FOR SHAFTS DRIVEN BY AN ELECTRIC MOTOR

The invention relates to a bearing system for shafts driven by an electric motor, particularly shafts of centrifuges, spinning machines, spinning buckets and the like.

Ball bearings are employed, as a rule, as bearing systems for shafts driven at high speed. It is difficult, however, to construct ball bearings that will operate at extremely high speeds, for example between 50 and 100,000 r.p.m., without loud running noise. Furthermore, after a relatively short period of operation, ball bearings must be replaced.

It is accordingly an object of the invention to provide a bearing system for shafts driven by an electric motor in which the running noise can be controlled relatively easily, and a correspondingly long service life is assured.

With the foregoing and other objects in view, there is provided, in accordance with the invention, a bearing system for shafts driven by an electric motor having a rotor, comprising an air bearing, and rotationally symmetric means located on the rotor and having rotationally symmetric surfaces at least partly forming supporting surfaces for the air bearing.

In accordance with further features of the invention, the rotationally symmetric means are either part of the rotor proper or are appendages extending from the rotor.

Other features which are considered as characteristic for the invention are set forth in the appended claims.

Although the invention is illustrated and described herein as embodied in a bearing system for shafts driven by an electric motor, it is nevertheless not intended to be limited to the details shown, since various modifications and structural changes may be made therein without departing from tha spirit of the invention and within the scope and range of equivalents of the claims.

The construction and method of operation of the invention, however, together with additional objects and advantages thereof will be best understood from the following description of specific embodiments when read in connection with the accompanying figures, wherein.

Figure 1:
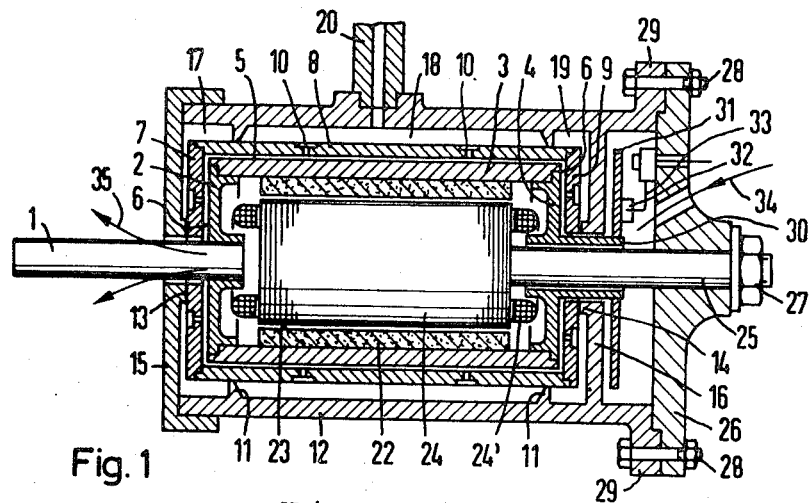
FIG. 1 is a longitudinal sectional view of an electric motor having an external rotor and air bearings according to the invention.

Referring now to the drawings and first particularly to FIG. 1 thereof, there is shown therein a motor having an external rotor for rotating the shaft 1 of a spinning machine, a centrifuge or the like, which is driven at high speed. The shaft 1 extends into a cover 2 located at one end face of a hollow cylindrical component of the external rotor. The hollow cylindrical component 3 is closed at the opposite end face thereof by a circular, ring-shaped cover 4. The outer surfaces of the components 2,3 and 4 of the external rotor form supporting surfaces of an air bearing that are surrounded by correspondingly shaped surfaces on hereinafter-described components 7,8 and 9 in such manner that an air gap 5 is produced at the cylindrical surface of the component 3 and air gaps 6 of corresponding thickness at the end faces located at the covers 2 and 4. The components 7,8 and 9, which are formed with holes 10 for supplying air, also form a hollow cylinder which is supported by ring-segment ribs 11 of a hollow-cylindrical casing 12 as well as by corresponding ribs 13 and 14 of a cover 15 and a wall 16, respectively, of the casing 12. Spaces 17, 18 and 19 located between the casing 12 and the hollow-cylindrical member 7, 8, 9 are connected to each other and are supplied with compressed air through a line 20.

Within the hollow cylindrical component 3, there are supported two opposing permanent magnets 22 in the form of ring segments. Instead of the permanentmagnets 22 in the component 3, a correspondingly permanently magnetized body in the form of a hollow cylinder may be substituted. Between the opposing magnets 22, separated by an air gap 23, there is located an internal stator 24 of the motor which is assembled in a conventional manner from metal-plate laminations. The strands of the stator winding 24' are disposed in suitably located slots. Preferably, the stator winding strands are energized with direct current through a non-illustrated conventional electronic commutation device so as to set the permanently magnetized rotor in rotation.

The stator 24 is supported by a post 25 which is threadedly secured to a cover 26 at 27. The cover 26 is in turn fastened to a flange 29 of the hollow cylindrical casing 12 by bolts 28.

A control disc 31 is secured to the component 4 at the one end face of the rotor through a tubular member 30. The tubular member 30 surrounds the post 25 with clearance but is also appropriately spaced radially within the hole formed in the casing wall 16. The control disc 31 carries, for example, a magnet system which cooperates with a Hall-effect generator control head 32 for conducting the commutation signals. The control lines are connected through terminal lugs 33, and the stator winding strands are supplied with current through the post 25 which is of hollow construction.

Through appropriate dimensioning of the components, cooling air can enter the motor as indicated by the arrow 34 and leave as indicated by the arrow 35.

As is apparent from FIG. 1, the main parts of the motor, such as the stator 24 and the permanent magnet 22, are located in the interior of the air bearing.

Figure 2:
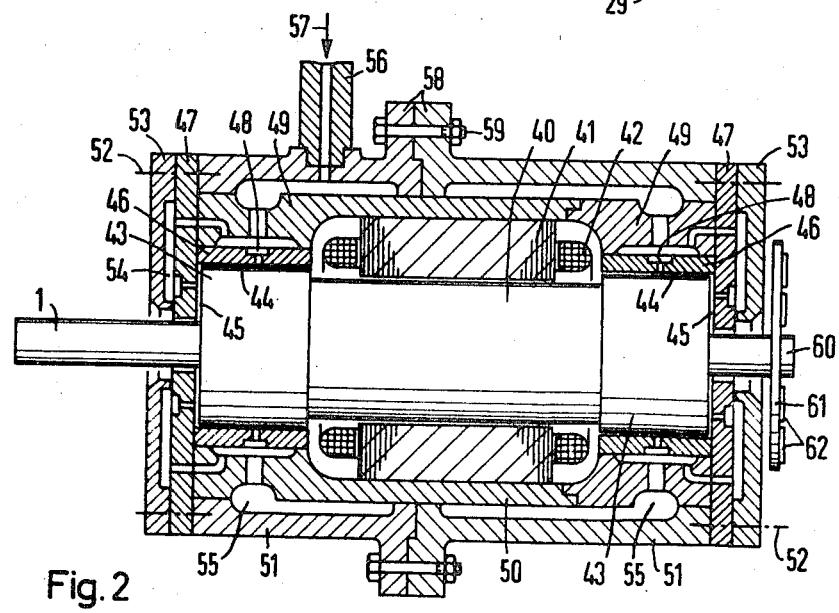
FIG. 2 is a sectional view of an electric motor having internal rotor and air bearings according to the invention.

In FIG. 2 there is shown an embodiment of a motor having an internal rotor 40 which is a permanent magnet rotor that, for example, carries a north and a south pole. The permanent-magnet rotor 40 is surrounded by a stack 41 of stator laminations which carries the stator winding 42 that is to be energized by an electronic commutation system corresponding to that of the embodiment shown in FIG. 1. At the permanent-magnet rotor 40 are mounted appendages or cylindrical support members 43 which, in the embodiment shown in FIG. 2, are disposed symmetrically to the stator. The cylindrical surfaces of the support member 43 partly form the supporting surfaces of the air bearings which are, in turn, formed by the air gaps 44 and 45. The air gaps 44 and 45 are defined by appropriately shaped hollow-cylindrical components 46 and annular-shaped components 37, to which compressed air is fed through bores 48. The component 46 is supported by a casing component 49 which is supported on the one hand by a stator component 50 and on the other hand by a casing component 51. The component 47 on a respective end face of the motor, is held by a cover 53 which is secured to the component 51 by bolts 52. Hollow spaces 54 and 55 serve to guide the compressed air, which is supplied through a connector 56, as indicated by the arrow 57. The two stator halves are of symmetrical construction and are connected to each other by flanges 58 and bolts 59.

In the cylindrical air support member 43, there is formed a bore in which there is secured, on the one hand, the shaft 1 and, on the other hand, a post 60. The latter carries a control member, such as a control disc 61, for example, which rotates with the shaft 1, and which cooperates with Hall-effect generator systems 62 in a conventional manner for commutating the motor.

The rotor according to FIG. 2 is constructed so that both of its air bearings 44, at the outer sides of the permanent magnets 40, have a diameter which is between the outer diameter of the permanent magnet 40 and the inner diameter of the stack 41 of laminations. Through this arrangement, it is possible to machine the rotor in assembled form so that the supporting cylindrical surfaces are accurately aligned. This applies correspondingly for the outer components of the air bearing parts.

The air bearings 44 and 45 according to FIG. 2 require very accurate machining and assembly of the cooperating surfaces. It is therefore advantageous if one of the appendages 43, preferably the one on the drive side, is constructed in the form of a cylinder, and the other appendage 43, in the shape of a sphere, so that centering in axial direction of the shaft 1 can be effected without great difficulty.

Figure 3:
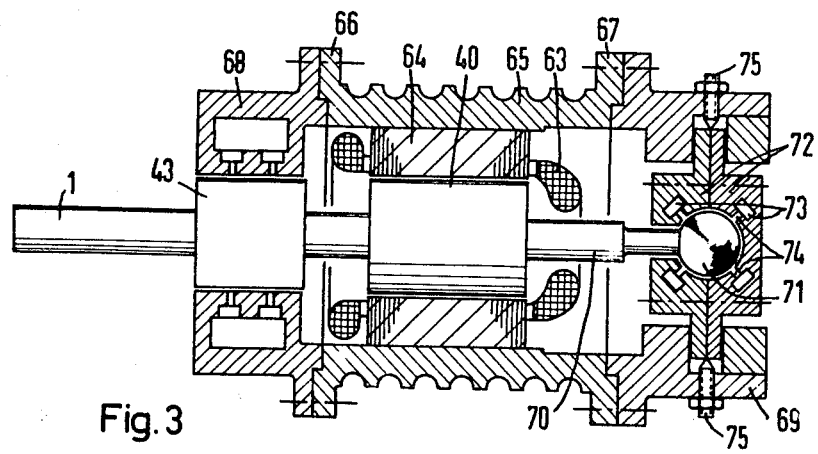
FIG. 3 is a sectional view of a modified form of the embodiment of FIG. 2.

FIG. 3 shows such an embodiment in principle wherein, however, the air bearings are separated from the motor. Those parts of the embodiment of FIG. 3 having the same functions as those of the embodiments of FIGS. 1 and 2 are identified by the same reference numerals. The magnet member 40 again forms the rotor of an electronic motor which is surrounded by a bell-shaped stator winding 63. The stator winding 63 is disposed in a bore formed in a magnetic yoke member 64 which is assembled from circular ring-shaped laminations. The magnetic yoke member 64 is surrounded by a casing component 65 that is provided with cooling fins. Air bearings 68 and 69 are secured to flanges 66 and 67 of the casing 65, the air bearing 68 on the drive side cooperating with a cylindrical support member 43 such as in the embodiment of FIG. 2, and the rear end of the shaft 70 carrying a spherical appendage 71, the surface of which forms part of an air bearing. The spherical appendage or extension 71 of the shaft 70 is surrounded by two air guide members 72. Air supply holes are formed in the air guide members 72, from which the air is conducted into the air bearings through bores 74. Adjustments of the air guide members 72 can be effected by means of a screw 75 by which the air guide members 72 can be moved in radial direction of the motor. The construction of the embodiment of FIG. 3 has the advantage that the individual components of the air bearings 68 and 69 can be manufactured and assembled separately.

Figure 4:
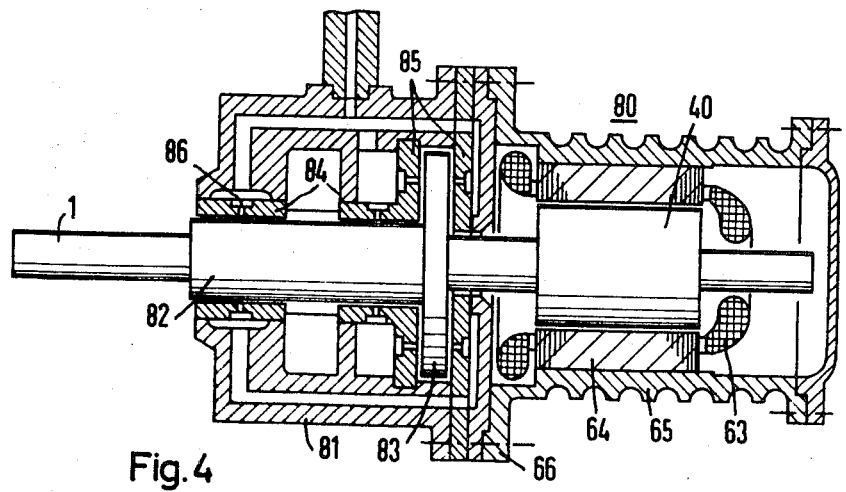
FIG. 4 is a sectional view of an embodiment of the invention with a motor flanged to an air-bearing casing.

FIG. 4 shows a further embodiment in principle wherein the motor 80 per se is flanged to the casing of an air bearing 81. The parts of the embodiment of FIG. 4 having the same function as those of FIG. 3 are identified by the same reference numerals. The shaft 1 is provided with a cylindrical part 82 and a disc-shaped part 83, the cylindrical surfaces of which are provided with corresponding counter-surfaces 84 and 85. Compressed air is supplied through bores 86. While the cylindrical part 82 of the shaft 1 serves for the bearing proper, the disc-shaped part 85 serves for fixing the shaft 1 against movement in axial direction. This construction has the advantage that the motor and the air bearings can be separately manufactured.

I claim:

1. Bearing system for shafts driven by an electric motor having a rotor, comprising an air bearing rotationally symmetric means located on the rotor and having rotationally symmetric surfaces at least partly forming supporting surfaces for said air bearing, said air bearing having a casing, and the motor being flanged to said casing, and a shaft extending through said air bearing casing and carrying a cylindrical part and a disshaped part thereon within said casing, said disc-shaped part serving to limit axial movement of said shaft.

* * * * *

CERTIFICATE OF CORRECTION

Patent No. 3,753,016      Dated August 14, 1973

Inventor(s) GERALD KLEIN

It is certified that error appears in the above-identified patent and that said Letters Patent are hereby corrected as shown below:

In the heading to the printed specification, there should be included --Foreign Application Priority Data March 18, 1971      Germany........P 21 13 186.2--

Signed and sealed this 27th day of November 1973.

(SEAL)
Attest:

EDWARD M. FLETCHER, JR.
Attesting Officer

RENE D. TEGTMEYER
Acting Commissioner of Patents